(12) United States Patent
Ma et al.

(10) Patent No.: US 11,829,734 B2
(45) Date of Patent: Nov. 28, 2023

(54) GRAPHICAL USER INTERFACE GENERATOR USING MARKUP LANGUAGE

(71) Applicant: Lemon Inc., Grand Cayman (KY)

(72) Inventors: Ziyan Ma, Los Angeles, CA (US); Nite Luo, Los Angeles, CA (US); Feifan Xu, Beijing (CN)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 17/573,163

(22) Filed: Jan. 11, 2022

(65) Prior Publication Data
US 2023/0221930 A1     Jul. 13, 2023

(51) Int. Cl.
*G06F 8/38* (2018.01)
(52) U.S. Cl.
CPC ..................... *G06F 8/38* (2013.01)
(58) Field of Classification Search
CPC ....................................................... G06F 8/30
See application file for complete search history.

(56) References Cited

U.S. PATENT DOCUMENTS

| | | | | |
|---|---|---|---|---|
| 6,826,540 B1 * | 11/2004 | Plantec | ................ | G09B 7/00 715/706 |
| 2006/0187849 A1 * | 8/2006 | Hamedi | ................ | H04L 69/03 370/252 |
| 2006/0285656 A1 * | 12/2006 | Saborowski | ............ | G06F 8/61 379/67.1 |
| 2010/0199206 A1 | 8/2010 | Dowling | | |
| 2013/0263086 A1 * | 10/2013 | Carter | ................ | G06F 8/33 717/113 |
| 2021/0149645 A1 | 5/2021 | Kang et al. | | |

FOREIGN PATENT DOCUMENTS

WO     2001/75597 A2     10/2001
WO     2018/035686 A1     3/2018

OTHER PUBLICATIONS

International Search Report dated Jul. 25, 2023 for International Application No. PCT/SG2023/050012.

\* cited by examiner

*Primary Examiner* — Phillip H Nguyen
(74) *Attorney, Agent, or Firm* — Faegre Drinker Biddle & Reath LLP

(57) ABSTRACT

A method for generating a user interface is described. A script file for a software component is received, the software component being configured by source code that specifies a plurality of variables for the software component. The script file is parsed for markup language that describes a graphical user interface for the plurality of variables of the software component. A graphical user interface for modifying values of the plurality of variables of the software component is automatically generated using the markup language.

20 Claims, 10 Drawing Sheets

600

RECEIVING A SCRIPT FILE FOR A SOFTWARE COMPONENT, THE SOFTWARE COMPONENT BEING CONFIGURED BY SOURCE CODE THAT SPECIFIES A PLURALITY OF VARIABLES FOR THE SOFTWARE COMPONENT — 602

PARSING THE SCRIPT FILE FOR MARKUP LANGUAGE THAT DESCRIBES A GRAPHICAL USER INTERFACE FOR THE PLURALITY OF VARIABLES OF THE SOFTWARE COMPONENT — 604

AUTOMATICALLY GENERATING, USING THE MARKUP LANGUAGE, A GRAPHICAL USER INTERFACE FOR MODIFYING VALUES OF THE PLURALITY OF VARIABLES OF THE SOFTWARE COMPONENT — 606

```
/**
```

@field {Texture} myDisplayTexture ← "label": "Texture"

↓

@field {Number} myTextureOpacity ← "label": "Texture Opacity" "display": "slider", "range": {"min": 0, "max": 10}

↓

@field {ComboBox} myBlendMode ← "label": "Blend Mode" "display": "combobox", "options": {"Linear Dodge": 0, "Color Burn": 1, "Soft Light": 2, "Multiply": 3}

↓

@field {Number} myBrightness ← "label": "Brightness" "display": "numberbox", "range": {"min": 0.0, "max": 1.0}

↓

@field {String} myDescription ← "label": "Description"

↓

@field {Color} myColor ← "label": "Color"

↓

@field {Boolean} myBoolReverse ← "label": "Reverse"

↓

@field {Rect} Location ← "step": 1.0

GRAPHICAL USER INTERFACE GENERATOR USING MARKUP LANGUAGE

BACKGROUND

Development of software components may be time-consuming and challenging, especially when the software components have a graphical aspect that may need fine-tuning to achieve a desired visual effect. For example, a software component that generates a graphical element having a rotating cube or other object displayed on a screen, variables such as a speed of rotation, a texture displayed on a surface of the cube, and a direction of rotation may be modified by a developer until the desired visual effect is achieved. When these variables are hard-coded and then modified by updates to source code, there is an increased risk of causing a compile error, which will bring unexpected rendering results to the graphical element (or preventing display at all). Although the developer may write source code that generates a graphical user interface for modifying the variables, the source code is specific to the software component and thus not reusable, which increases development times for other software components.

It is with respect to these and other general considerations that examples have been described. Also, although relatively specific problems have been discussed, it should be understood that the examples should not be limited to solving the specific problems identified in the background.

SUMMARY

Aspects of the present disclosure are directed to generating a graphical user interface.

In one aspect, a method for generating a user interface is provided. A script file for a software component is received, the software component being configured by source code that specifies a plurality of variables for the software component. The script file is parsed for markup language that describes a graphical user interface for the plurality of variables of the software component. A graphical user interface for modifying values of the plurality of variables of the software component is automatically generated using the markup language.

In another aspect, a system for generating a graphical user interface is provided. The system includes one or more hardware processors configured by machine-readable instructions to: receive a script file for a software component, the software component being configured by source code that specifies a plurality of variables for the software component; parse the script file for markup language that describes a graphical user interface for the plurality of variables of the software component; and automatically generate, using the markup language, a graphical user interface for modifying values of the plurality of variables of the software component.

In yet another aspect, a non-transient computer-readable storage medium is provided. The medium includes instructions being executable by one or more processors, that when executed by the one or more processors, cause the one or more processors to: receive a script file for a software component, the software component being configured by source code that specifies a plurality of variables for the software component; parse the script file for markup language that describes a graphical user interface for the plurality of variables of the software component; and automatically generate, using the markup language, a graphical user interface for modifying values of the plurality of variables of the software component.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS/FIGURES

Non-limiting and non-exhaustive examples are described with reference to the following Figures.

FIGS. 3A-3B depict a diagram of an example script file for the system of FIG. 1, in accordance with examples of the present disclosure.

DETAILED DESCRIPTION

In the following detailed description, references are made to the accompanying drawings that form a part hereof, and in which are shown by way of illustrations specific examples. These aspects may be combined, other aspects may be utilized, and structural changes may be made without departing from the present disclosure. Examples may be practiced as methods, systems, or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Writing source code for software components is complex and requires detailed knowledge of programming techniques. The present disclosure describes various examples of systems and methods for generating user interfaces for modifying software components. More specifically, the systems and methods described herein provide for generating a graphical user interface that automatically includes widgets for features of a component script. Although a graphical user interface may be coded to provide widgets for editing a predetermined program component, the user interface displays widgets (i.e., user interface control elements) for component scripts "on the fly," allowing for a customized user interface. By using widgets, complexity of adjustments to the program code are reduced from skilled text entry of program code to simply clicking, dragging, or other simple interactions, which makes designing and generating software components easier, faster, and less error prone. Moreover, the widgets are dynamically generated based on a user-friendly annotation script that is both human-readable and computer-readable. This approach simplifies changes in the graphical user interface used for modifying the software component itself and promotes reusability among other software components.

Figure 1:
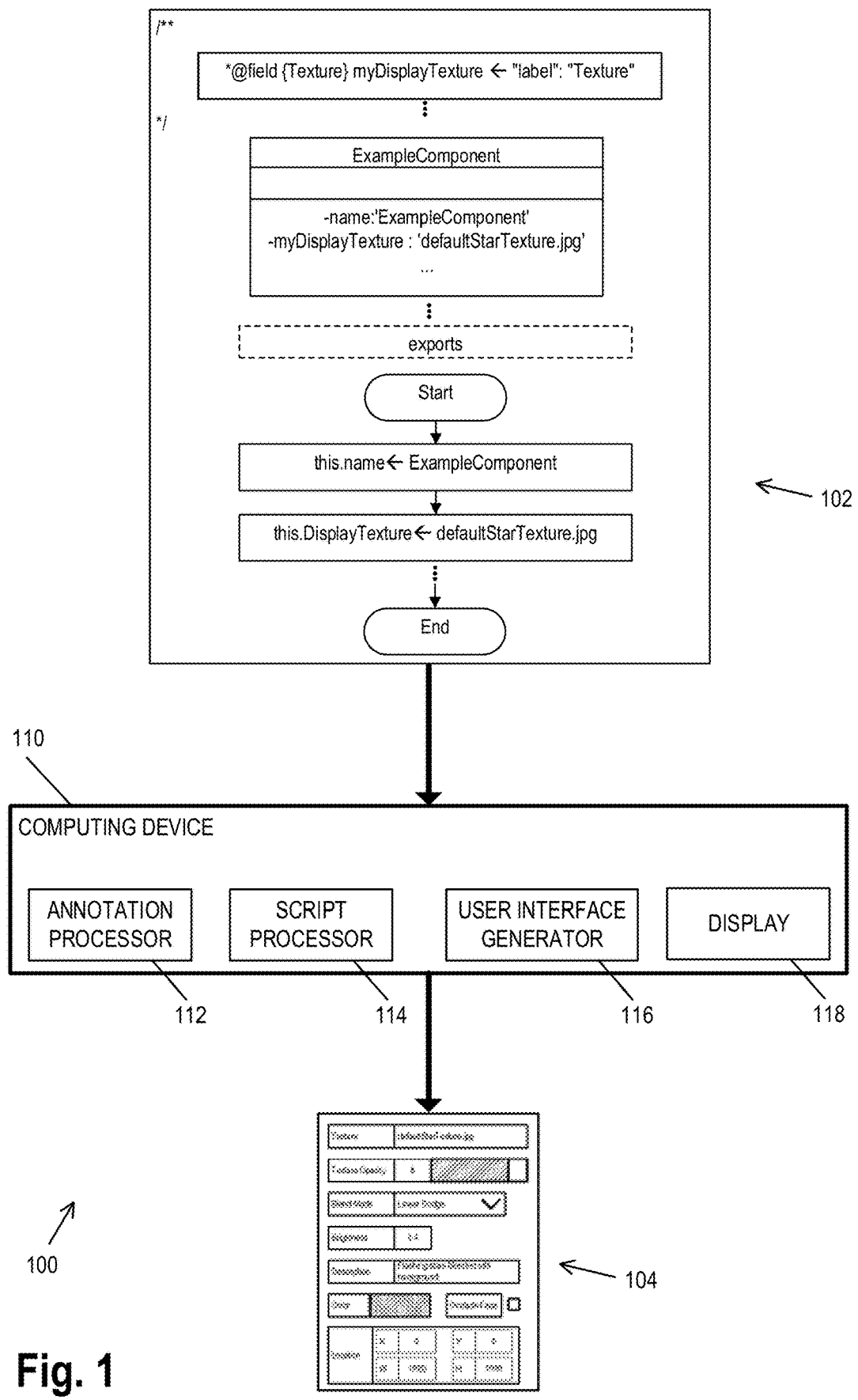
FIG. 1 depicts a block diagram of an example of a system for generating a user interface, in accordance with examples of the present disclosure.

This and many further examples for a computing device are described herein. For instance, FIG. 1 shows a block diagram of an example of a system for generating a graphical user interface, in accordance with examples of the present disclosure. The system 100 includes a computing device 110 that is configured to process script files, such as script file 102, and automatically generate a suitable graphical user interface (GUI, e.g., GUI 104) for modifying variables within the script file 102. Although the script file 102 and GUI 104 are referred to as individual elements, the script file 102 may be implemented as two, three, or more script files in some examples. Moreover, the GUI 104 may be implemented and/or displayed as two, three, or more components (e.g., windows or frames) in some examples.

The computing device 110 may be any type of computing device, including a smartphone, mobile computer or mobile computing device (e.g., a Microsoft® Surface® device, a laptop computer, a notebook computer, a tablet computer such as an Apple iPad™ a netbook, etc.), or a stationary computing device such as a desktop computer or PC (personal computer). In some examples, the computing device 110 may be configured to communicate with a cloud processing provider, network storage provider, software as a service provider, or other suitable entity, for example, using suitable software and a suitable communication network (not shown). The computing device 110 may be configured to execute one or more software applications (or "applications") and/or services and/or manage hardware resources (e.g., processors, memory, etc.), which may be utilized by users of the computing device 110.

Computing device 110 comprises an annotation processor 112, a script processor 114, a user interface generator 116, and a display 118. In some examples, at least some of the annotation processor 112, the script processor 114, and/or the user interface generator 116 may be combined into fewer modules (e.g., combining the annotation processor 112 with the script processor 114). The annotation processor 112 is configured to process a script file and identify graphical user interface widgets ("widgets") for software components within the script file. The script file may be a document or file containing metadata for a software component and source code for the software component. The source code may specify a plurality of variables for the software component, functions, classes, methods, and/or other suitable software elements.

Generally, the script file includes markup language that describes a graphical user interface for the plurality of variables of the software component. As one example, source code for a software component may include variables for different purposes, such as managing a color selected by a user, a description, opacity levels, blending modes, or other suitable purposes. Even when a source code language, such as JavaScript, avoids static typing, having a described type is useful when generating a graphical user interface. For example, a user may more efficiently modify variables of a software component when the variables have a type associated with them. For example, a color may be typed as a Color type associated with a color picker widget, an opacity level may be typed as a number type associated with a numerical slider widget, and a true/false value may be typed as a Boolean type associated with a checkbox widget. In examples where a source code language does not natively support such typing, the script file provides type information for variables in a manner that avoids changes to the source code of the software component itself.

Figure 3B:
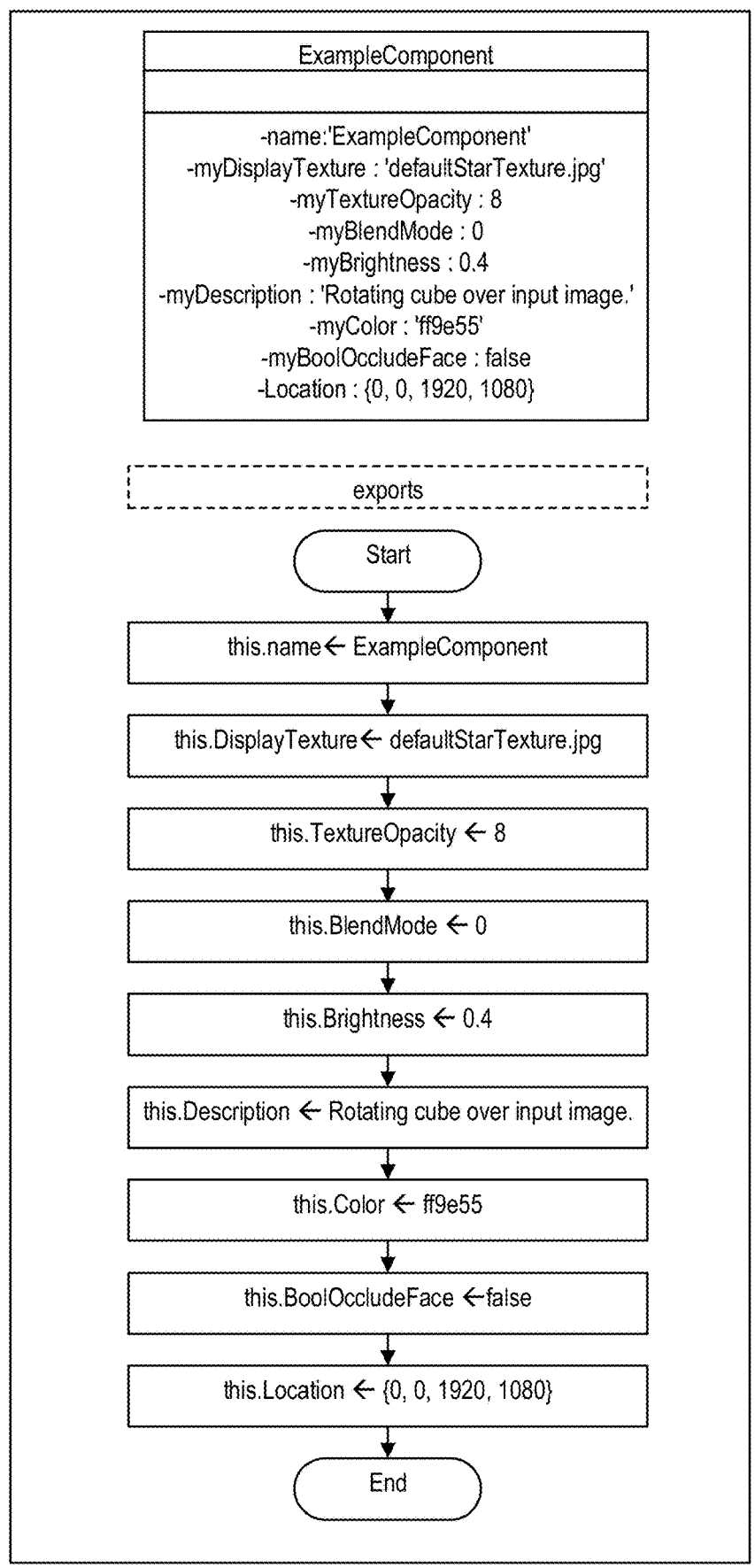

In some examples, the markup language may be considered an annotation or comment of the source code itself, which is parsed and converted by the annotation processor 112 into suitable instructions for generating a customized graphical user interface. The instructions may then be provided to the user interface generator 116 for generation of the graphical user interface. In some examples, the script file includes both the source code and the markup language and may be implemented as a JavaScript file, TypeScript file, a text file, or other suitable file (e.g., sample.js, sample.jsx, sample.ts, sample.tsx, sample.txt). In other examples, the source code and markup language are maintained in separate files, for example, a user interface script file for the markup language and a code script file for the source code. When maintained separately, the user interface script file may have a same type as the code script file (e.g., both being implemented as .jsx files or .tsx files) or have different file types (e.g., a .jsx file as a source code file and a .tsx file or .txt file as a user interface script file). An example user interface script file, also referred to as an annotation script 310, and an example code script file, also referred to as a code script 320, are shown in FIG. 3A and FIG. 3B.

The script processor 114 is configured to process the source code of the software component, for example, by compiling, interpreting, and/or executing the source code. In some examples, the software component is configured to display a graphical element when executed and modification of the variables of the source code is more intuitive when the graphical element is modified in real-time (or near real-time). The computing device 110, through the annotation processor 112, the script processor 114, the user interface generator 116, and the display 118, is configured to display the graphical element (e.g., by executing the source code with the script processor 114), identify suitable widgets for modifying the display of the graphical element (e.g., by parsing the user interface script file with the annotation processor 112), generate the GUI with the identified widgets (e.g., using the user interface generator 116), and display the generated GUI and graphical element on the display 118.

The user interface generator 116 is configured to generate and display a user interface for modifying program code for the software component. Advantageously, the generated GUI allows a user to adjust or modify the variables using simple interactions (e.g., clicking, dragging, or simple text entry) instead of writing program code or scripts (e.g., JavaScript, TypeScript, C, C #, Python). For example, a graphical element that displays a spinning cube may have a plurality of variables that affect a spin rate, size, and color of the spinning cube.

In some examples, the user interface generator 116 is also configured to generate a software component configuration file (not shown) that defines the plurality of variables. For example, after a user has previewed several iterations of the graphical element with different variable values, the user may export current values of the plurality of variables to the software component configuration file so that the software component may be shared with other users and/or computing devices.

The display 118 is configured to show a user interface of the computing device 110. In various examples, the display 118 is a touchscreen display of a smartphone, a monitor for a desktop computer, etc.

Figure 2B:
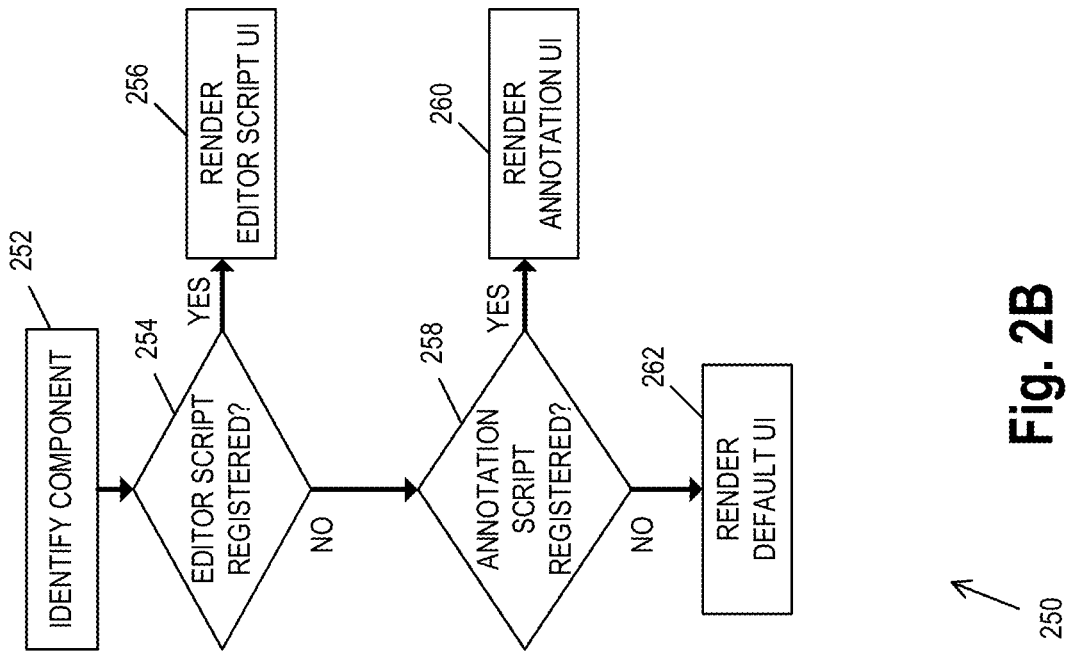
FIG. 2B depicts an example flow chart for a graphical user interface generation method, in accordance with examples of the present disclosure.
Figure 2A:
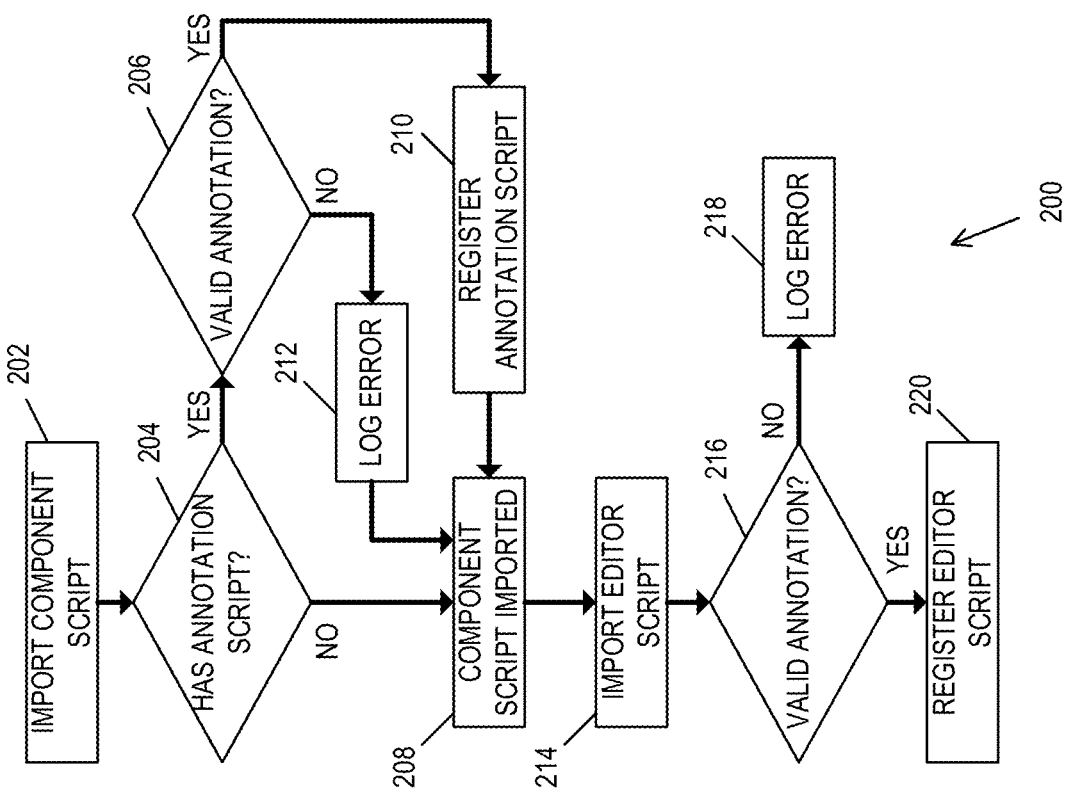
FIG. 2A depicts an example flow chart for a script registration method, in accordance with examples of the present disclosure.

FIG. 2A depicts an example flow chart for a script registration method 200, in accordance with examples of the present disclosure. During script registration, a script file with markup language for a software component is processed and checked for validity (e.g., proper syntax and format) and when found to be valid, the markup language is registered for use by an integrated development environment (IDE) or other graphical user interface (e.g., graphical user interface 412, graphical user interface 512). In some examples, the script file is a component script file that includes both source code and the markup language. In other examples, the script file is a user interface script file that includes the markup language, but is separate from a code script file that includes the source code.

Generally, script registration may be performed by the computing device 110, for example, via the annotation processor 112, the script processor 114, the user interface generator 116, and/or the display 118, or by another suitable computing device. Technical processes shown in these figures will be performed automatically unless otherwise indicated. In any given example, some steps of a process may be repeated, perhaps with different parameters or data to operate on. Steps in an example may also be performed in a different order than the top-to-bottom order that is laid out in FIG. 2A. Steps may be performed serially, in a partially overlapping manner, or fully in parallel. Thus, the order in which steps of method 200 are performed may vary from one performance to the process of another performance of the process. Steps may also be omitted, combined, renamed, regrouped, be performed on one or more machines, or otherwise depart from the illustrated flow, provided that the process performed is operable and conforms to at least one claim.

At step 202, a request for importing a component script file is received. In some examples, the request is received by the computing device 110 via an integrated development environment (IDE), such as Orion, Microsoft Visual Studio, or other suitable software development tool. The component script file may generally correspond to a script file 300, described below with respect to FIGS. 3A-3B. In some examples, the component script may correspond to the annotation script 310.

At step 204, the annotation processor 112 determines whether an annotation script is present within the component script file. When the annotation script is present, the method 200 proceeds to step 206, otherwise the method 200 proceeds to step 208.

At step 206, the annotation processor 112 determines whether the markup language within the annotation script 310 is valid. For example, the annotation processor 112 determines whether the markup language has proper syntax, antecedent basis, or is otherwise suitable for generating a graphical user interface for the software component. When the markup language of the annotation script 310 is valid, the annotation processor 112 registers the annotation script 310 (step 210). When the markup language is not valid (e.g., due to syntax errors), the annotation processor 112 logs a suitable error (step 212) and proceeds to step 208.

At step 208, the script processor 114 completes importation of the component script file, for example, by validating source code of the component script file (e.g., validating code script 320).

Figure 5:
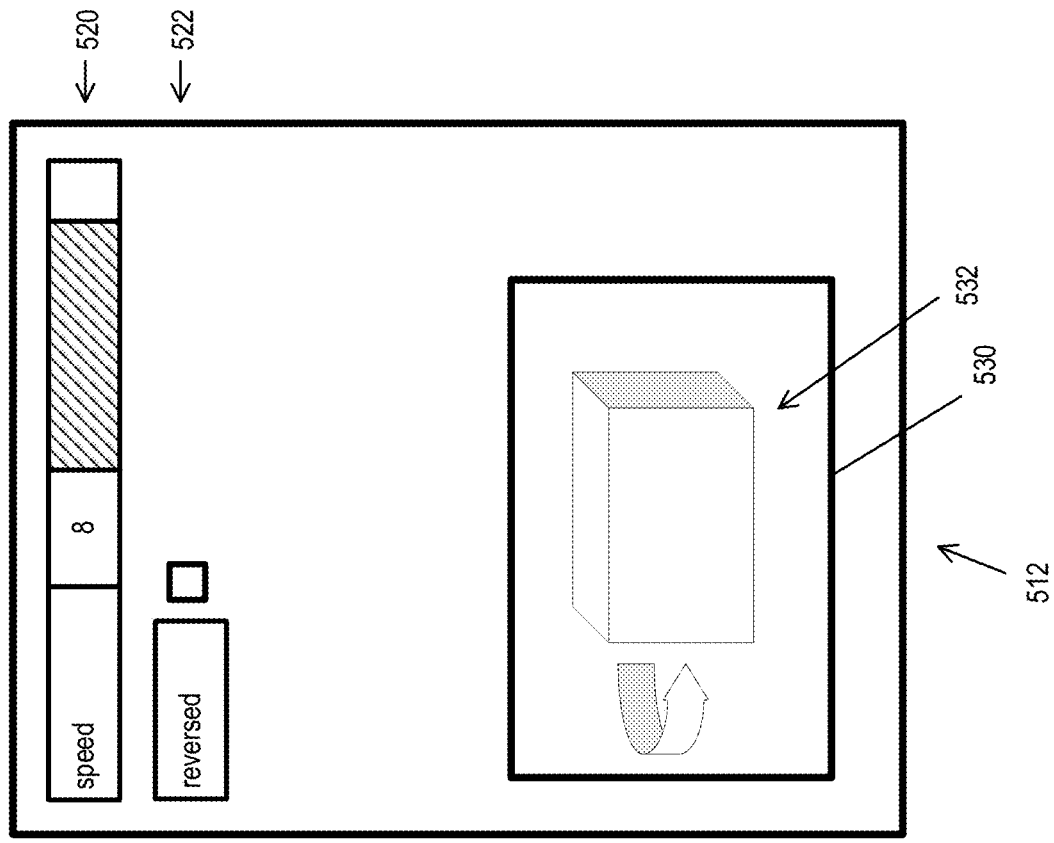
FIG. 5 depicts a diagram of another example of an example graphical user interface with an example editor script, in accordance with examples the present disclosure.

In some examples, the flow chart 200 also includes registration of an editor script associated with the software component, such as an editor script 510 (FIG. 5). At step 214, a request for importing the editor script 510 is received. In some examples, the request is received by the computing device 110 via an integrated development environment (IDE), such as Orion, Microsoft Visual Studio, or other suitable software development tool.

At step 216, the annotation processor 112 determines whether the markup language within the editor script 510 is valid (e.g., has proper syntax, antecedent basis, etc.).

When the markup language within the editor script 510 is not valid (e.g., due to syntax errors), the annotation processor 112 logs a suitable error (step 218).

When the markup language of the editor script 510 is valid, the annotation processor 112 registers the editor script 510 (step 220).

FIG. 2B depicts an example flow chart for a graphical user interface generation method 250, in accordance with examples of the present disclosure. During the method 250, one or more of registered markup language (from step 210) and registered editor script (from step 220) are processed and a suitable graphical user interface is generated by the user interface generator 116.

At step 252, a software component is identified, for example, by reading a list of registered software components for an IDE.

At step 254, the user interface generator 116 determines whether an editor script has been registered for the software component. When an editor script has been registered, the method 250 proceeds to step 256, where the editor script is processed and a suitable GUI is generated based on markup language within the editor script. In one example, the user interface generator 116 processes the editor script 510 and generates the GUI 512.

When an editor script has not been registered, the method 250 proceeds to step 258 and determines whether an annotation script has been registered for the software component. When an annotation script has been registered, the method 250 proceeds to step 260, where the annotation script is processed and a suitable GUI is generated based on markup language within the annotation script. In one example, the user interface generator 116 processes the annotation script 310 and generates the GUI 412.

When an annotation script has not been registered, the user interface generator 116 generates a default user interface (step 262). The default user interface may correspond to a default interface for modifying source code of the software component from the IDE, without additional widgets for modifying variables of the source code, for example.

FIGS. 3A-3B depict a diagram of an example script file 300 for the system of FIG. 1, in accordance with examples of the present disclosure. The script file 300 includes an annotation script 310 and a code script 320. The code script 320 includes source code that specifies a plurality of variables for the software component. In the example shown in FIG. 3B, the plurality of variables includes a name variable, a myDisplayTexture variable, a myTextureOpacity variable, a myBlendMode variable, a myBrightness variable, a myDescription variable, a myColor variable, a myBoolReverse variable, and a Location variable. The code script 320 may also include other source code elements, such as constructor functions, class definitions, instantiation calls, or other suitable elements. Notably, the code script 320 does not include explicit type information for the plurality of variables. For example, code for the myDisplayTexture variable may be as follows: this.myDisplayTexture='defaultStarTexture.jpg';. The script file 300 may correspond to the script file 102, in some examples.

The annotation script 310 includes markup language that describes a graphical user interface for the plurality of variables of the software component. In the example shown in FIGS. 3A-3B, the markup language may be written using an extension of JSDoc, an application programming interface documentation generator. For example, JSDoc uses tags (e.g., @param, @constructor) to assist in generating user documentation in hypertext markup language (HTML) for a software component. The computing device 110 is configured to extend JSDoc to further include type information for variables and also describe user interface widgets to be generated.

In the example of FIG. 3A, the annotation script 310 identifies a variable using an @Field tag and indicates type information for the variable using an explicit type within curly braces. For example, the annotation script 310 identifies the variable myDisplayTexture as being typed as a Texture type. The annotation script 310 includes additional widget information (e.g., widget properties, features, or display characteristics) for a variable within curly braces. For example, the annotation script 310 indicates that a widget for the myDisplayTexture variable should have a label of "Texture". Thus, the annotation script 310 may identify texture type information for the variable myDisplayTexture using the following code: @field {Texture} myDisplayTexture—{"label": "Texture"}. As another example, the annotation script 310 identifies the variable myTextureOpacity as being typed as a Number type with a corresponding widget having a label of "Texture Opacity", a widget type of "slider", and a range for the slider between a minimum of 0 and a maximum of 10; in an example, the following code may identify the variable and type information with associated widgets as @field {Number} myTextureOpacity—{"label": "Texture Opacity" "display": "slider", "range": {"min": 0, "max": 10}}. In other examples, the user interface widget indicated within the annotation script 310 may be one of a slider, a dropdown box, a color picker, a checkbox, a combobox, or other suitable widget. In other examples, the variables may be typed as one of a Boolean type, a Number type, a String type, a Vector type, a Texture type, a Mesh type, or other suitable type.

Figure 4:
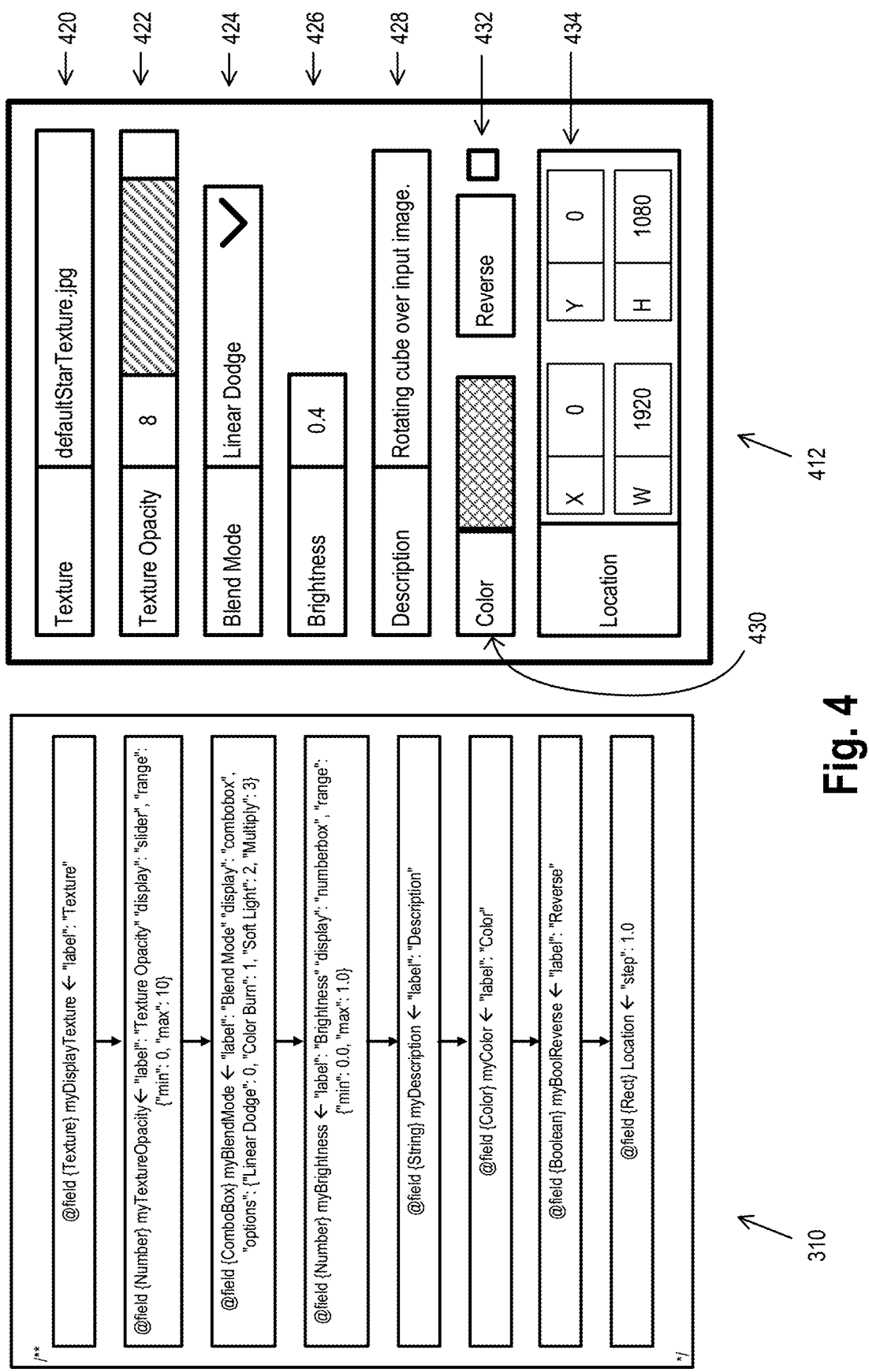
FIG. 4 depicts a diagram of an example of an example graphical user interface with an example annotation script, in accordance with examples the present disclosure.

FIG. 4 depicts a diagram of an example graphical user interface (GUI) 412 with an example annotation script 310, in accordance with examples the present disclosure. The annotation script 310 is the same as that shown in FIG. 3A and each variable of the annotation script 310 has been processed (e.g., by the user interface generator 116) to generate the GUI 412. Although the GUI 412 is shown as a separate window, some portions of the GUI 412, or the GUI 412 in its entirety, may be implemented as a plugin for use with an IDE. The GUI 412 generally corresponds to the GUI 104, in some examples.

The user interface generator 116 may generate the GUI 412 to include widgets for some or all of the plurality of variables of the software component using the annotation script 310. In some examples, variables may have predetermined values, required values, or be identified as being "private" variables and may not have a corresponding widget within the GUI 412. For example, some variables may identify a required operating system environment of the software component, such as Android, iOS, or Windows to prevent its use on incompatible computing devices. As such, variables that are not adjustable by the user may be omitted from the GUI 412. In other examples, variables that are not adjustable are shown with a widget that is inactive or greyed out.

In the example shown in FIG. 4, the GUI 412 includes a texture widget 420, a texture opacity widget 422, a blend mode widget 424, a brightness widget 426, a description widget 428, a first color widget 430, a reverse widget 332, and a rectangle widget 434. In other examples, the GUI 412 may include additional or fewer widgets. When a large number of variables are available for adjustment, the GUI 412 may be organized with multiple tabs (not shown), each tab showing a different set of variables.

The texture widget 420 is configured to prompt the user for selection of a texture to be applied with the software component. In the example shown in FIG. 4, the texture is an image file ("defaultStarTexture.jpg"). Thus, the annotation script 310 may identify texture type information for the variable myDisplayTexture using the following non-limiting code: @field {Texture} myDisplayTexture—{"label": "Texture"}, and in some instances may follow a comment designator (e.g., "*") or otherwise be within a comment section (e.g., "/** . . . */"). In other examples, the texture widget 420 may also include a preview window of a raw texture.

The texture opacity widget 422 includes a slider and display value for a current value of opacity of the graphical element, for example, from 0 (fully transparent) to 10 (fully opaque). Advantageously, the slider prevents a user from entering an invalid value (e.g., −3 or 27) that could lead to a compilation error or crash of the graphical element. Moreover, the user does not need to manually create software code that generates the slider; instead, widgets are automatically created based on the markup language. Thus, the annotation script 310 may include the following non-limiting code to identify the variable and type information with associated widgets as @field {Number} myTextureOpacity—{"label": "Texture Opacity" "display": "slider", "range": {"min": 0, "max": 10}}, and in some instances may follow a comment designator or otherwise be within a comment section.

The blend mode widget 424 includes a combobox for selection of a blend mode. Drop-down options for the combobox are provided as a list with corresponding integer index. Thus, the annotation script 310 may include the following non-limiting code to identify the variable and type information with associated widgets as @field {ComboBox} myBlendMode—{"label": "Blend Mode" "display": "combobox", "options": {"Linear Dodge": 0, "Color Burn": 1, "Soft Light": 2, "Multiply": 3}}, and in some instances may follow a comment designator or otherwise be within a comment section.

The brightness widget 426 includes a display value within a number box, having a range of 0.0 to 1.0, for a current value of brightness of the graphical element. Thus, the annotation script 310 may include the following non-limiting code to identify the variable and type information with associated widgets as @field {Number} myBrightness—{"label": "Brightness" "display": "numberbox", "range": {"min": 0.0, "max": 1.0}}, and in some instances may follow a comment designator or otherwise be within a comment section.

The description widget 428 includes a String field for modifying a description of the graphical element. Thus, the annotation script 310 may include the following non-limiting code to identify the variable and type information as @field {String} myDescription—{"label": "Description"}, and in some instances may follow a comment designator or otherwise be within a comment section.

The first color widget 430 includes a color picker for selection of colors (e.g., RGB values, CMYK values, etc.) to be applied to the graphical element. Thus, the annotation script 310 may include the following non-limiting code to identify the variable and type information as @field {Color} myColor—{"label": "Color"}, and in some instances may follow a comment designator or otherwise be within a comment section.

The reverse widget 432 includes a checkbox for changing a direction of rotation of the graphical element. Thus, the annotation script 310 may include the following non-limiting code to identify the variable and type information as @field {Boolean} myBoolReverse—{"label": "Reverse"}, and in some instances may follow a comment designator or otherwise be within a comment section.

The rectangle widget 434 includes number boxes for X and Y coordinates, and a width and height of the graphical element. In the example shown in FIG. 4, the annotation script 310 limits a step size of fields within the rectangle widget to intervals of 1.0 pixels. Thus, the annotation script 310 may include the following non-limiting code to identify the variable and type information as @field {Rect} Location—{"step": 1.0}, and in some instances may follow a comment designator or otherwise be within a comment section.

FIG. 5 depicts a diagram of another example of an example graphical user interface (GUI) 512 with an example editor script 510, in accordance with examples the present disclosure. The GUI 512 includes a speed slider widget 520 and a reverse checkbox 522, properties of which are described in Fields of the editor script 510. In contrast to the annotation script 310 which is written in a JSDoc-like language, the editor script 510 is written using TypeScript, JavaScript, or another suitable language and the markup language is XML, for example. A non-limiting example of the editor script 510 is provided below:

```
// MyRotateUI.tsx
@registerScriptUI('MyRotate.js')
class MyRotateUI extends ScriptUI {
    public renderInspector(props): ReactNode{
        return <>
            <Field name='speed'
                attributes={{
                    range: {min: 0, max: 10},
                    slider: true
                }}
            />
            <Field name='reversed' />
        </>
    }
}
```

In some examples, the GUI 412 and/or the GUI 512 include a preview pane 530 for display of a graphical element 532 generated by the software component. The preview pane 530 is configured to show a preview of a graphical element 532 using current values of variables, for example, values as shown in the GUI 412 and/or GUI 512. In other words, as a user modifies values of the variables using the GUI 412 and/or GUI 512, the preview pane 530 is updated to display the graphical element 532 in accordance with the updated values (e.g., rotating faster or slower when the speed slider widget 520 is modified, rotating in a reverse direction when the reverse checkbox 522 is checked). Although only a single image is shown in the preview pane 530, the preview pane 530 is configured to show a video (or stream of images) in some examples, for example, when visual effects applied to the graphical element 532 are variable over time.

Figure 6:
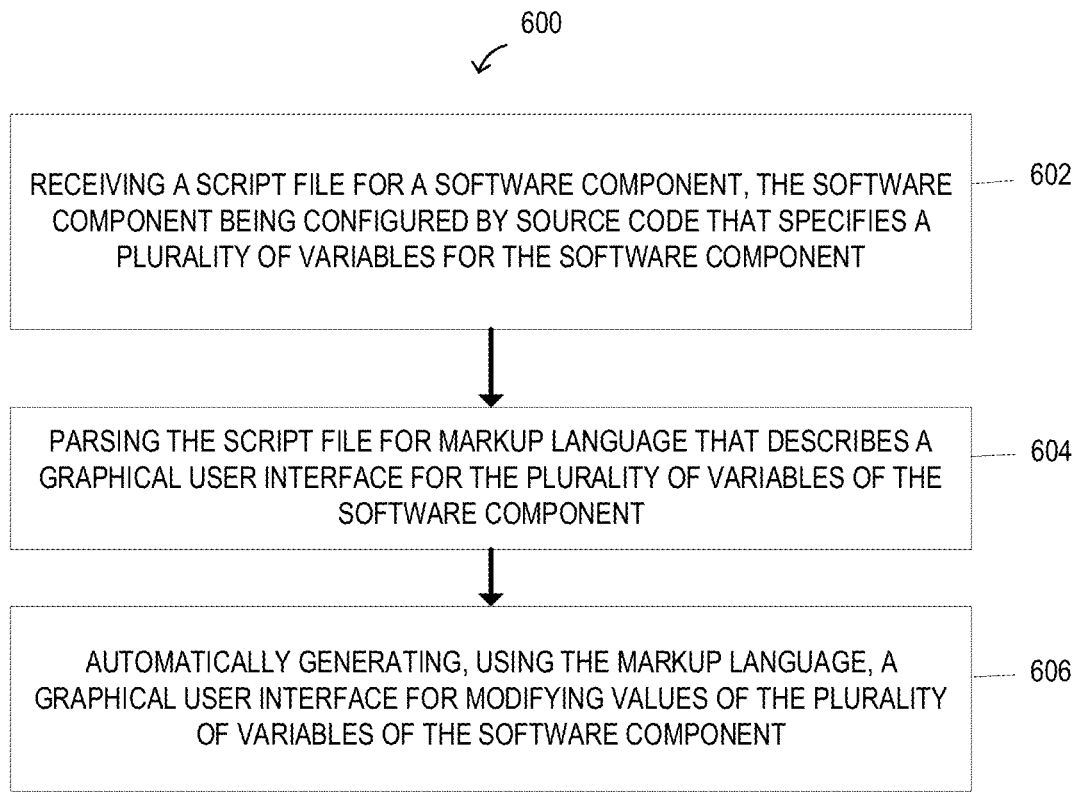
FIG. 6 depicts a flowchart of an example method of generating a graphical user interface, in accordance with examples of the present disclosure.

FIG. 6 depicts a flowchart of an example method of generating a graphical user interface, in accordance with examples of the present disclosure. Technical processes shown in these figures will be performed automatically unless otherwise indicated. In any given example, some steps of a process may be repeated, perhaps with different parameters or data to operate on. Steps in an example may also be performed in a different order than the top-to-bottom order that is laid out in FIG. 6. Steps may be performed serially, in a partially overlapping manner, or fully in parallel. Thus, the order in which steps of method 600 are performed may vary from one performance to the process of another performance of the process. Steps may also be omitted, combined, renamed, regrouped, be performed on one or more machines, or otherwise depart from the illustrated flow, provided that the process performed is operable and conforms to at least one claim. The steps of FIG. 6 may be performed by the computing device 110 (e.g., via the annotation processor 112, the script processor 114, the user interface generator 116, and/or the display 118), or another suitable computing device.

Method 600 begins with step 602. At step 602, a script file is received for a software component, the software component being configured by source code that specifies a plurality of variables for the software component. In various examples, the script file generally corresponds to the component script file 300, the annotation script 310, or the editor script 510.

At step 604, the script file is parsed for markup language that describes a graphical user interface for the plurality of variables of the software component. In some examples, the annotation processor 112 parses the component script file 300, the annotation script 310, or the editor script 510.

At step 606, a graphical user interface for modifying values of the plurality of variables of the software component is automatically generated using the markup language. In some examples, the user interface generator 116 automatically generates the GUI 412 or the GUI 512.

In some examples, the markup language specifies explicit type information for the plurality of variables and the source code that specifies the plurality of variables does not specify type information for the plurality of variables. In an example, the markup language is an extension of JSDoc. In an example, the script file includes the source code and the markup language. In an example, the markup language specifies a type for a variable of the plurality of variables as one of a Boolean, a number, a string, a vector, a texture, and a mesh. In an example, the markup language is contained within a comment section of the script file.

In some examples, the markup language describes a user interface widget for at least one variable of the plurality of variables. In an example, the user interface widget is one of a slider, a dropdown box, a color picker, a checkbox, and/or a combobox.

In some examples, the script file is a user interface script file that describes the graphical user interface using TypeScript; and the source code is in a code script file that is separate from the user interface script file.

In some examples, the software component is configured to display a graphical element; and automatically generating includes: generating the graphical user interface to include the graphical element; and dynamically updating the graphical element based on modified values of the plurality of variables from the graphical user interface.

Figure 7:
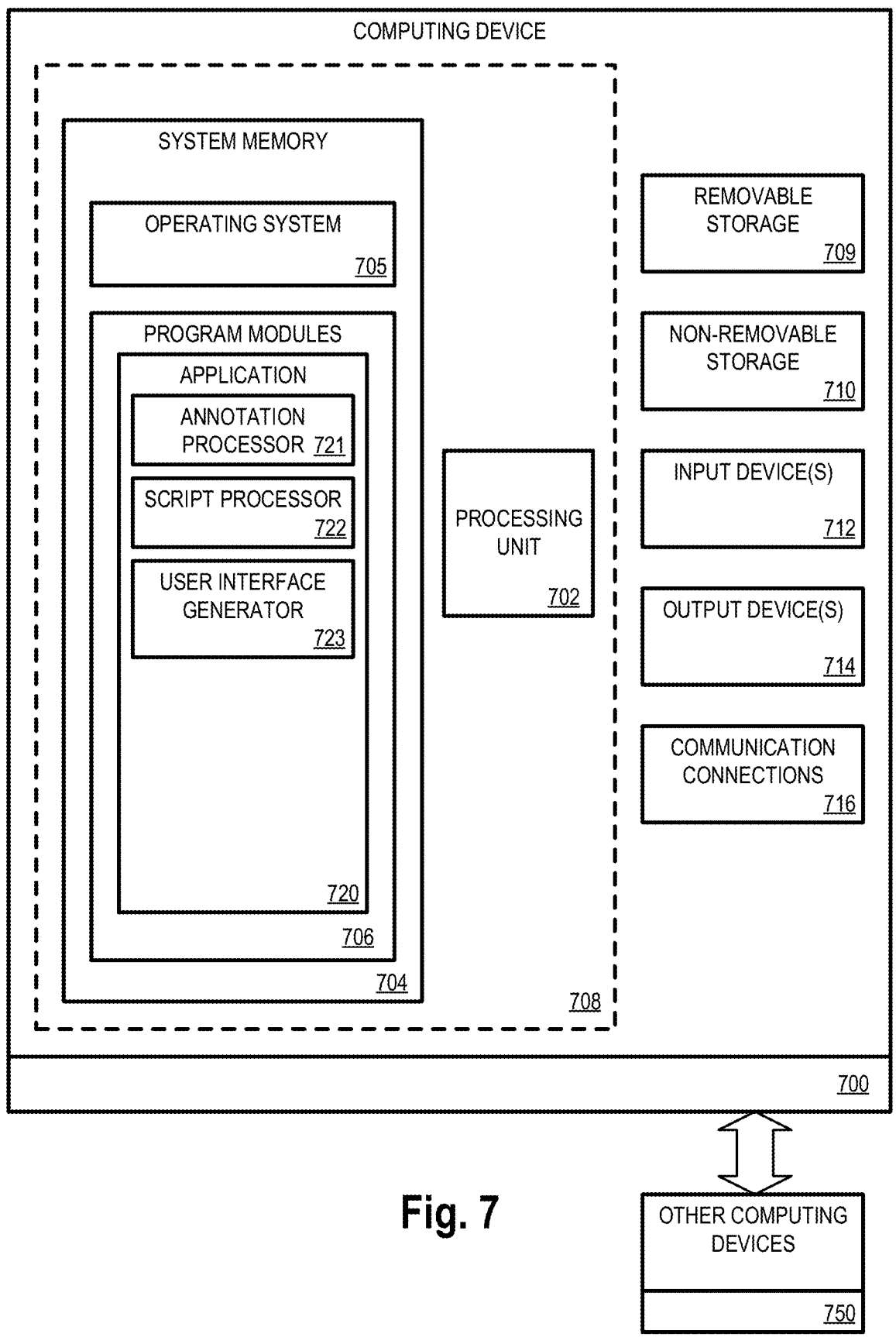
FIG. 7 is a block diagram illustrating example physical components of a computing device with which aspects of the disclosure may be practiced.
Figure 8:
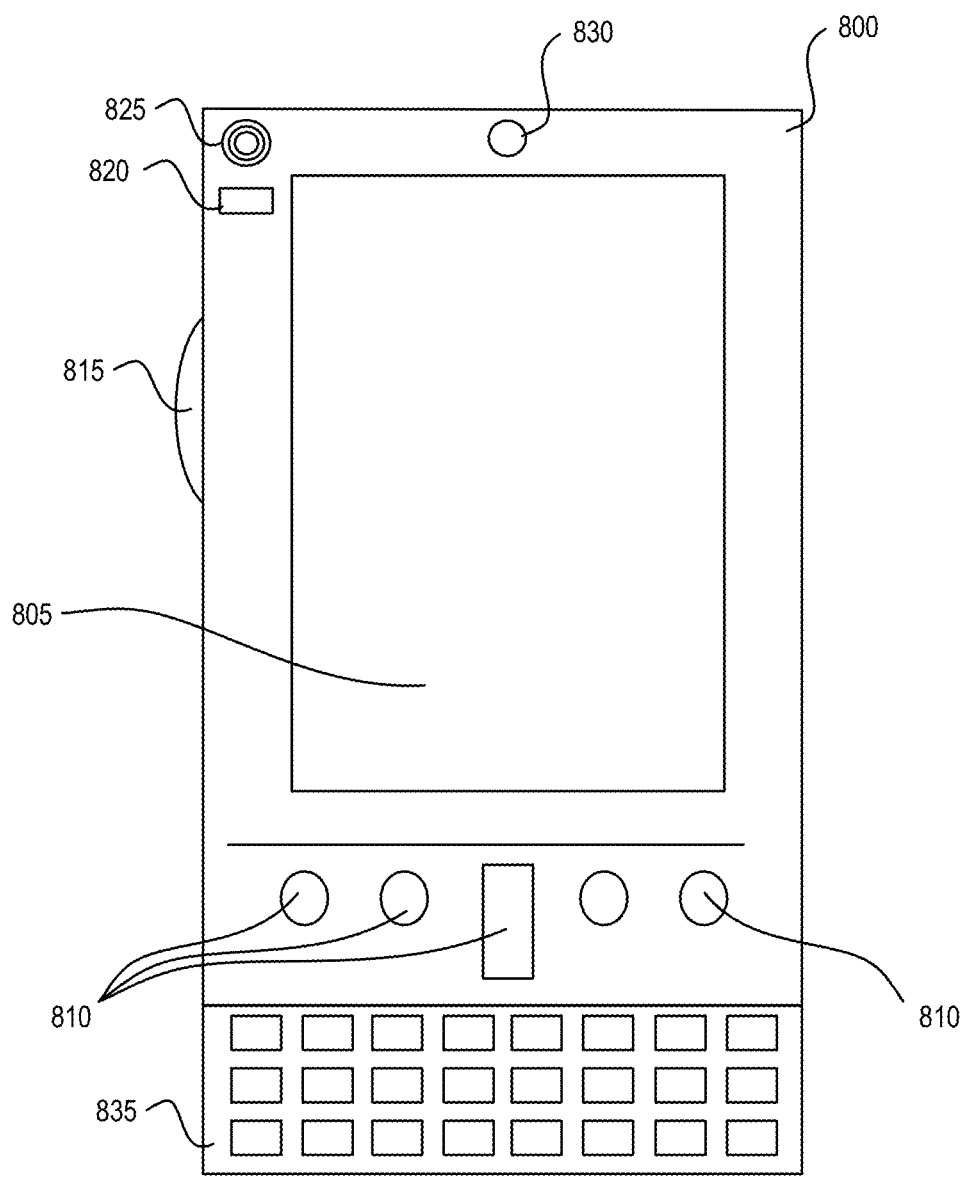
FIGS. 8 and 9 are simplified block diagrams of a mobile computing device with which aspects of the present disclosure may be practiced.
Figure 9:
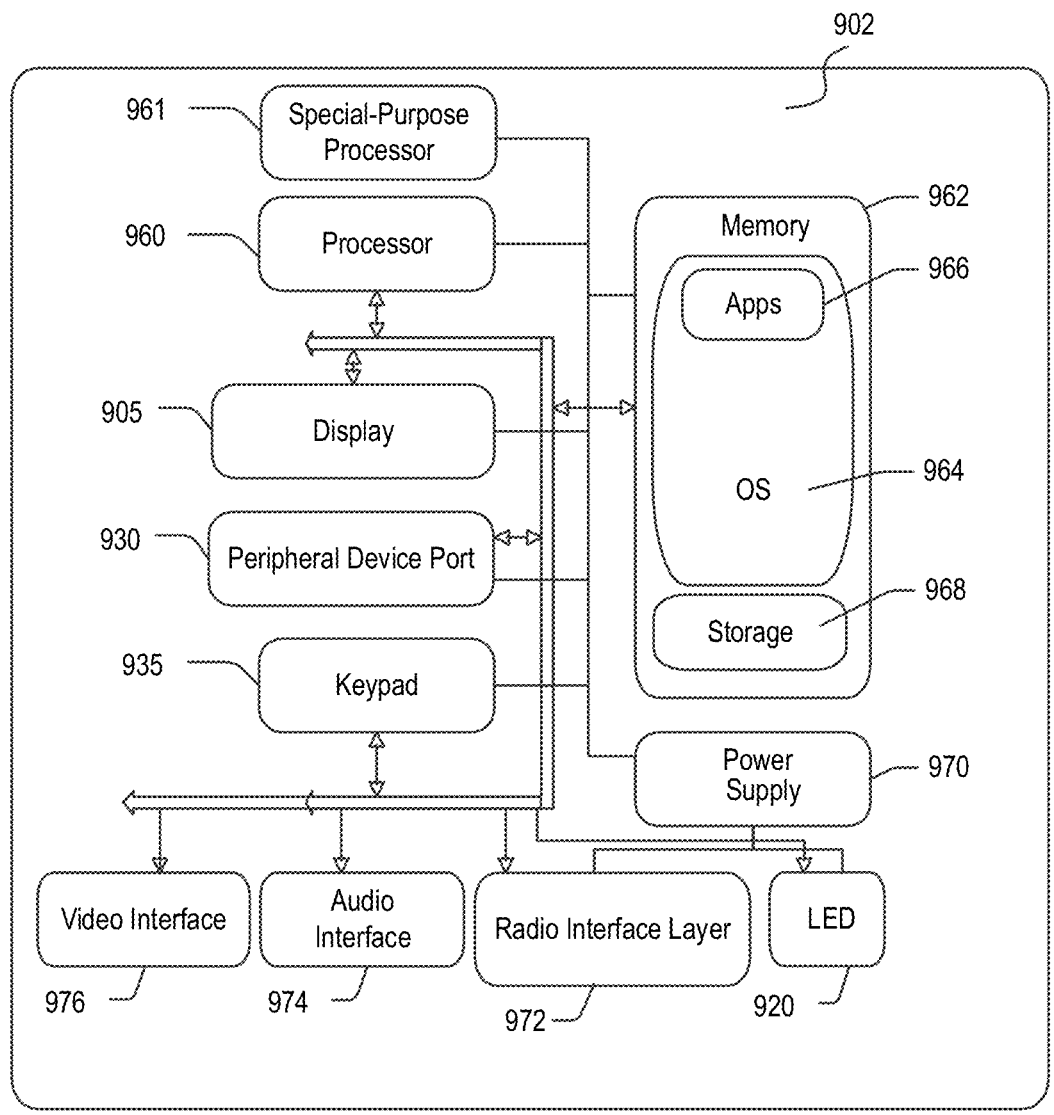

FIGS. 7, 8, and 9 and the associated descriptions provide a discussion of a variety of operating environments in which aspects of the disclosure may be practiced. However, the devices and systems illustrated and discussed with respect to FIGS. 7, 8, and 9 are for purposes of example and illustration and are not limiting of a vast number of computing device configurations that may be utilized for practicing aspects of the disclosure, as described herein.

FIG. 7 is a block diagram illustrating physical components (e.g., hardware) of a computing device 700 with which aspects of the disclosure may be practiced. The computing device components described below may have computer executable instructions for implementing a graphical user interface application 720 on a computing device (e.g., computing device 110), including computer executable instructions for graphical user interface application 720 that can be executed to implement the methods disclosed herein. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running graphical user interface application 720, such as one or more components with regard to FIGS. 1 and 2, and, in particular, annotation processor 721 (e.g., corresponding to annotation processor 112), script processor 722 (e.g., corresponding to script processor 114), and user interface generator 723 (e.g., corresponding to user interface generator 116).

The operating system 705, for example, may be suitable for controlling the operation of the computing device 700. Furthermore, examples of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 (e.g., graphical user interface application 720) may perform processes including, but not limited to, the aspects, as described herein. Other program modules that may be used in accordance with aspects of the present disclosure, and in particular for generating a graphical user interface, may include annotation processor 721, script processor 722, and user interface generator 723.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Examples of the disclosure may also be practiced using other technologies capable of performing logical operations such as, for example, AND, OR, and NOT, including but not limited to mechanical, optical, fluidic, and quantum technologies. In addition, examples of the disclosure may be practiced within a general-purpose computer or in any other circuits or systems.

The computing device 700 may also have one or more input device(s) 712 such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 8 and 9 illustrate a mobile computing device 800, for example, a mobile telephone, a smart phone, wearable computer (such as a smart watch), a tablet computer, a laptop computer, and the like, with which examples of the disclosure may be practiced. In some aspects, the client may be a mobile computing device. With reference to FIG. 8, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative aspects, mobile computing device 800 may incorporate more or less input elements. For example, the display 805 may not be a touch screen in some examples. In yet another alternative example, the mobile computing device 800 is a portable phone system, such as a cellular phone. The mobile computing device 800 may include a front-facing camera 830. The mobile computing device 800 may also include an optional keypad 835. Optional keypad 835 may be a physical keypad or a "soft" keypad generated on the touch screen display. In various examples, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 9 is a block diagram illustrating the architecture of one aspect of a mobile computing device. That is, the mobile computing device 800 can incorporate a system (e.g., an architecture) 902 to implement some aspects. In one example, the system 902 is implemented as a "smart phone" capable of running one or more applications (e.g., browser, e-mail, calendaring, contact managers, messaging clients, games, and media clients/players). In some aspects, the system 902 is integrated as a computing device, such as an integrated personal digital assistant (PDA) and wireless phone. The system 902 may include a display 905 (analogous to display 805), such as a touch-screen display or other suitable user interface. The system 902 may also include an optional keypad 935 (analogous to keypad 835) and one or more peripheral device ports 930, such as input and/or output ports for audio, video, control signals, or other suitable signals.

The system 902 may include a processor 960 coupled to memory 962, in some examples. The system 902 may also include a special-purpose processor 961, such as a neural network processor. One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as email or other messages used by an email application, and the like. A synchronization application (not shown) also resides on the system 902 and is programmed to interact with a corresponding synchronization application resident on a host computer to keep the information stored in the non-volatile storage area 968 synchronized with corresponding information stored at the host computer.

The system 902 has a power supply 970, which may be implemented as one or more batteries. The power supply 970 may further include an external power source, such as an AC adapter or a powered docking cradle that supplements or recharges the batteries.

The system 902 may also include a radio interface layer 972 that performs the function of transmitting and receiving radio frequency communications. The radio interface layer 972 facilitates wireless connectivity between the system 902 and the "outside world," via a communications carrier or service provider. Transmissions to and from the radio interface layer 972 are conducted under control of the operating system 964. In other words, communications received by the radio interface layer 972 may be disseminated to the application programs 966 via the operating system 964, and vice versa.

The visual indicator 920 may be used to provide visual notifications, and/or an audio interface 974 may be used for producing audible notifications via an audio transducer 825 (e.g., audio transducer 825 illustrated in FIG. 8). In the illustrated example, the visual indicator 920 is a light emitting diode (LED) and the audio transducer 825 may be a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 825, the audio interface 974 may also be coupled to a microphone to receive audible input, such as to facilitate a telephone conversation. In accordance with examples of the present disclosure, the microphone may also serve as an audio sensor to facilitate control of notifications, as will be described below. The system 902 may further include a video interface 976 that enables an operation of peripheral device 930 (e.g., on-board camera) to record still images, video stream, and the like.

A mobile computing device 800 implementing the system 902 may have additional features or functionality. For example, the mobile computing device 800 may also include additional data storage devices (removable and/or non-removable) such as, magnetic disks, optical disks, or tape. Such additional storage is illustrated in FIG. 9 by the non-volatile storage area 968.

Data/information generated or captured by the mobile computing device 800 and stored via the system 902 may be stored locally on the mobile computing device 800, as described above, or the data may be stored on any number of storage media that may be accessed by the device via the radio interface layer 972 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 972 or via a distributed computing network. Similarly, such data/information may be readily transferred between computing devices for storage and use according to well-known data/information transfer and storage means, including electronic mail and collaborative data/information sharing systems.

As should be appreciated, FIGS. 8 and 9 are described for purposes of illustrating the present methods and systems and is not intended to limit the disclosure to a particular sequence of steps or a particular combination of hardware or software components.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits several known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

Several variations and modifications of the disclosure can be used. It would be possible to provide for some features of the disclosure without providing others.

In other configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar standards and protocols not mentioned herein are in existence and are included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

The present disclosure relates to systems and methods for generating a graphical user interface according to at least the examples provided in the sections below:

(A1) In one aspect, some examples include a method for generating a user interface. The method includes receiving a script file for a software component, the software component being configured by source code that specifies a plurality of variables for the software component; parsing the script file for markup language that describes a graphical user interface for the plurality of variables of the software component; and automatically generating, using the markup language, a graphical user interface for modifying values of the plurality of variables of the software component.

(A2) In some examples of A1, the markup language specifies explicit type information for the plurality of variables and the source code that specifies the plurality of variables does not specify type information for the plurality of variables.

(A3) In some examples of A1-A2, the markup language is an extension of JSDoc.

(A4) In some examples of A1-A3, the script file includes the source code and the markup language.

(A5) In some examples of A1-A4, the markup language specifies a type for a variable of the plurality of variables as one of a Boolean, a number, a string, a vector, a texture, and a mesh.

(A6) In some examples of A1-A5, the markup language is contained within a comment section of the script file.

(A7) In some examples of A1-A6, the markup language describes a user interface widget for at least one variable of the plurality of variables.

(A8) In some examples of A1-A7, the user interface widget is one of a slider, a dropdown box, a color picker, a checkbox, and/or a combobox.

(A9) In some examples of A1-A8, the script file is a user interface script file that describes the graphical user interface using TypeScript; and the source code is in a code script file that is separate from the user interface script file.

(A10) In some examples of A1-A9, the software component is configured to display a graphical element; and automatically generating includes: generating the graphical user interface to include the graphical element; and dynamically updating the graphical element based on modified values of the plurality of variables from the graphical user interface.

In yet another aspect, some examples include a computing system including one or more processors and memory coupled to the one or more processors, the memory storing one or more instructions which when executed by the one or more processors, causes the one or more processors perform any of the methods described herein (e.g., A1-A14 described above).

In yet another aspect, some examples include a non-transitory computer-readable storage medium storing one or more programs for execution by one or more processors of a storage device, the one or more programs including instructions for performing any of the methods described herein (e.g., A1-A14 described above). Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for generating a user interface, the method comprising:
   receiving a script file for a software component, the software component being configured by source code that specifies a plurality of variables for the software component wherein the source code does not specify type information for the plurality of variable;
   parsing the script file for markup language that describes a graphical user interface for the plurality of variables of the software component, wherein the markup language specifies explicit type information for the plurality of variables, and wherein the markup language is wholly contained within a comment section of the script file; and
   automatically generating, using the markup language wholly contained with the comment section of the script file, a graphical user interface for modifying values of the plurality of variables of the software component.

2. The method of claim 1, wherein the markup language is an extension of JSDoc.

3. The method of claim 1, wherein the script file includes the source code and the markup language.

4. The method of claim 1, wherein the markup language specifies a type for a variable of the plurality of variables as one of a Boolean, a number, a string, a vector, a texture, and a mesh.

5. The method of claim 1, wherein the markup language describes a user interface widget for at least one variable of the plurality of variables.

6. The method of claim 5, wherein the user interface widget is one of a slider, a dropdown box, a color picker, a checkbox, and/or a combobox.

7. The method of claim 1, wherein:
the script file is a user interface script file that describes the graphical user interface using TypeScript; and
the source code is in a code script file that is separate from the user interface script file.

8. The method of claim 1, wherein:
the software component is configured to display a graphical element; and
automatically generating includes:
generating the graphical user interface to include the graphical element; and
dynamically updating the graphical element based on modified values of the plurality of variables from the graphical user interface.

9. A system for generating a graphical user interface, the system comprising:
one or more hardware processors configured by machine-readable instructions to:
receive a script file for a software component, the software component being configured by source code that specifies a plurality of variables for the software component, wherein the source code does not specify type information for the plurality of variable;
parse the script file for markup language that describes a graphical user interface for the plurality of variables of the software component, wherein the markup language specifies explicit type information for the plurality of variables, and wherein the markup language is wholly contained within a comment section of the script file; and
automatically generate, using the markup language wholly contained with the comment section of the script file, a graphical user interface for modifying values of the plurality of variables of the software component.

10. The system of claim 9, wherein the script file includes the source code and the markup language and the markup language is contained within a comment section of the script file.

11. The system of claim 9, wherein the markup language describes a user interface widget for at least one variable of the plurality of variables.

12. The system of claim 9, wherein:
the software component is configured to display a graphical element; and
wherein the one or more hardware processors are further configured by machine-readable instructions to:
generate the graphical user interface to include the graphical element; and
dynamically update the graphical element based on modified values of the plurality of variables from the graphical user interface.

13. A non-transitory computer-readable storage medium comprising instructions being executable by one or more processors, that when executed by the one or more processors, cause the one or more processors to:
receive a script file for a software component, the software component being configured by source code that specifies a plurality of variables for the software component, wherein the source code does not specify type information for the plurality of variable;
parse the script file for markup language that describes a graphical user interface for the plurality of variables of the software component, wherein the markup language specifies explicit type information for the plurality of variables, and wherein the markup language is wholly contained within a comment section of the script file; and
automatically generate, using the markup language wholly contained with the comment section of the script file, a graphical user interface for modifying values of the plurality of variables of the software component.

14. The computer-readable storage medium of claim 13, wherein the script file includes the source code and the markup language and the markup language is contained within a comment section of the script file.

15. The computer-readable storage medium of claim 13, wherein the markup language describes a user interface widget for at least one variable of the plurality of variables.

16. The computer-readable storage medium of claim 13, wherein the software component is configured to display a graphical element; and
wherein the instructions are executable by the one or more processors to cause the one or more processors to:
generate the graphical user interface to include the graphical element; and
dynamically update the graphical element based on modified values of the plurality of variables from the graphical user interface.

17. The system of claim 9, wherein the script file includes the source code and the markup language.

18. The system of claim 9, wherein the markup language specifies a type for a variable of the plurality of variables as one of a Boolean, a number, a string, a vector, a texture, and a mesh.

19. The computer-readable storage medium of claim 13, wherein the script file includes the source code and the markup language.

20. The computer-readable storage medium of claim 13, wherein the markup language specifies a type for a variable of the plurality of variables as one of a Boolean, a number, a string, a vector, a texture, and a mesh.

* * * * *